July 26, 1955

A. E. WELCH 2,714,070

MICROWAVE HEATING APPARATUS AND METHOD
OF HEATING A FOOD PACKAGE

Filed April 4, 1950

INVENTOR
ARTHUR E. WELCH
BY
ATTORNEY

July 26, 1955   A. E. WELCH   2,714,070
MICROWAVE HEATING APPARATUS AND METHOD
OF HEATING A FOOD PACKAGE
Filed April 4, 1950   2 Sheets-Sheet 2
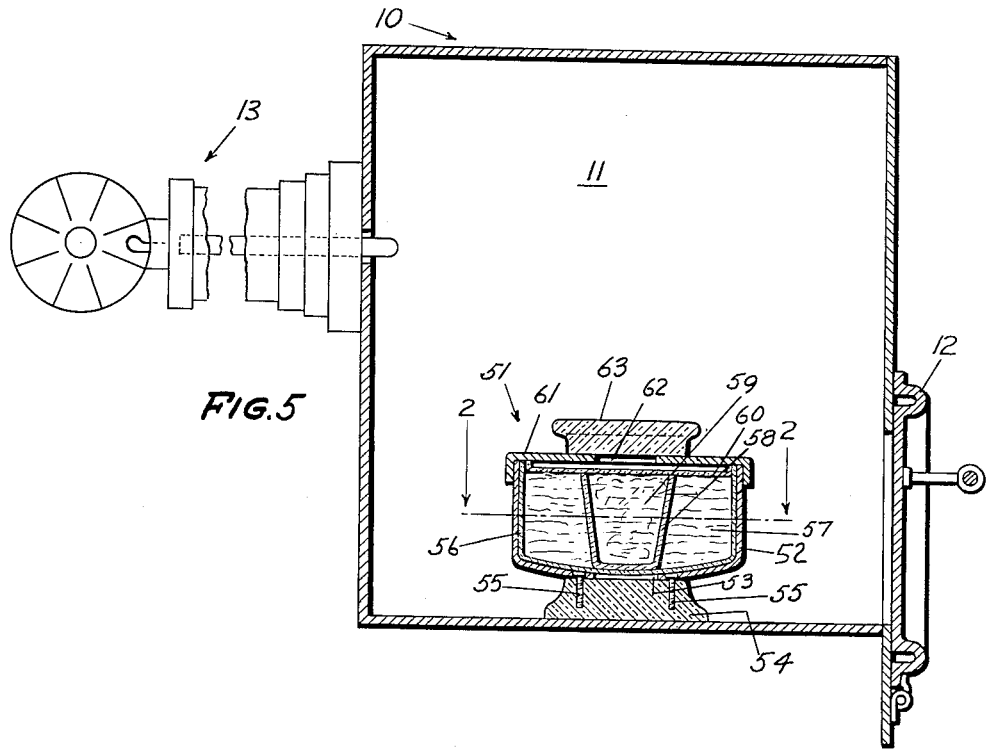
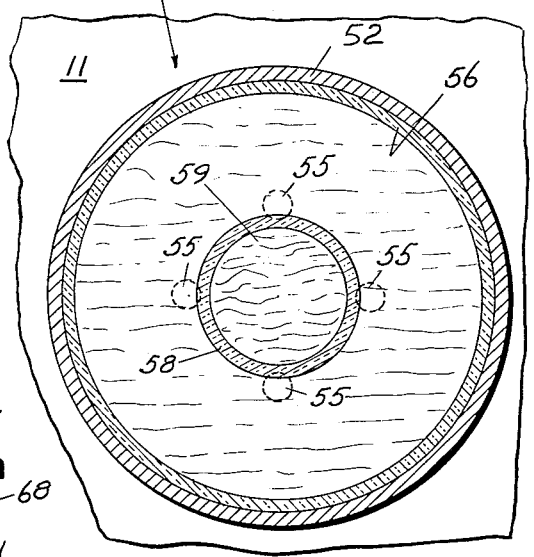
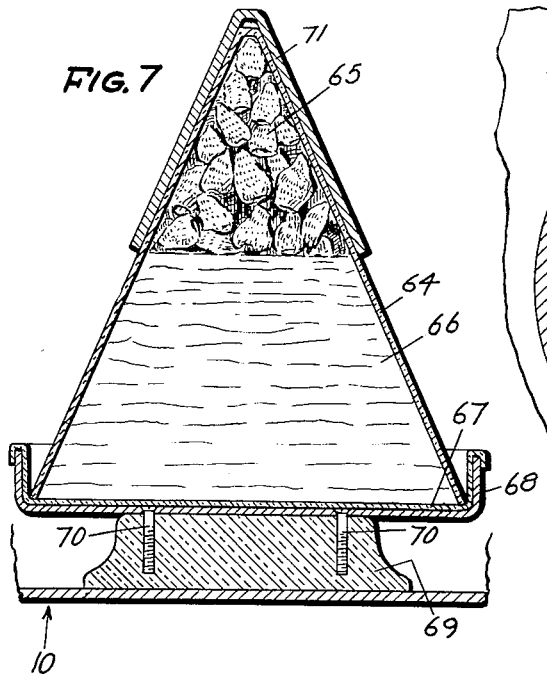
INVENTOR
ARTHUR E. WELCH
BY Elmer J. Gorn
ATTORNEY

United States Patent Office

2,714,070
Patented July 26, 1955

---

2,714,070

MICROWAVE HEATING APPARATUS AND METHOD OF HEATING A FOOD PACKAGE

Arthur E. Welch, Sudbury, Mass., assignor to Raytheon Manufacturing Company, Newton, Mass., a corporation of Delaware Application April 4, 1950, Serial No. 153,915

12 Claims. (Cl. 99—221)

This invention relates to methods and means for heating lossy dielectric material with microwaves, and more particularly to the selective heating of various portions of the lossy dielectric body by the use of electrostatic shielding members.

In the heating of food or other lossy dielectric substances by microwaves, it has been found that the edges and corner portions of the body to be heated have a tendency to heat more rapidly than the interior portions of the body. Particularly, when a frozen food body which contains ice crystals is heated by microwaves, the edges of the body thaw first and are then heated rapidly, while the interior portions of the body which still contain ice crystals have a tendency to reflect the energy. This causes dehydration and burning of the surfaces and corners of the food body.

This invention discloses methods and means whereby energy may be directed in any desired concentration to any desired portion of the body to be heated, whereby a selective heating of any desired portion of said body may be produced.

One embodiment of this invention discloses a device comprising a dielectric container which may be filled with food and then frozen or refrigerated to preservation temperature for any desired storage period. The container has associated therewith a metallic shielding member which will direct microwave energy toward the inner portions of the food body. In particular, the shielding member comprises a metal shield which covers the top of the dielectric container such that, when said container is placed in an electronic cooker, the metal shield shields the upper surface from direct impingement of microwave energy thereon. Microwave energy in the electronic cooker enters said container around the sides and bottom thereof and is absorbed by the food body. Overheating of the food body at the sides and bottom is prevented partially by the fact that the food is in direct contact with the container in these areas, and the container, which is of low-loss material and hence cold, conducts the excess heat away from hot spots on the food container interface. In addition, as the side and bottom surfaces of the frozen food body are melted, moisture is liberated, which collects in the voids between the side and bottom surfaces of the food body and the container, and dissipates the excess heat from hot spots as steam. The result is a more even and uniform absorption of microwave energy by the food body. In addition, the shield condenses water vapor driven off from the food body by the heating thereof, said water vapor dripping back onto the food body, thereby returning the moisture thereto and preventing the dehydration thereof.

In another embodiment of this invention, a dielectric container having therein food to be heated has a metallic shield resting directly on the food body.

In a further extension of the principle of selective heating, there is disclosed an embodiment of the invention wherein a frozen body such as an ice cream body is sufficiently shielded to prevent any substantial degree of heating thereof, while a sauce which is associated with said ice cream body, thereby making a complete dessert dish, is heated to the correct temperature.

In a still further embodiment of this invention, there is provided apparatus whereby a frozen food body which is stored in a dielectric container may have the edges thereof which contact said dielectric container heated sufficiently to loosen the bond between said dielectric container and the food body, whereby the dielectric container covering the food body may be withdrawn from the food body, thereby exposing said food body for eating purposes. In addition, a metallic shield member may be placed over portions of the dielectric member to prevent overheating of a particular portion of the food body, due to its shape or energy absorption characteristic during the bond loosening process.

Other and further advantages of this invention will be apparent as the description thereof progresses, reference being had to the accompanying drawings, wherein:

Fig. 5 illustrates a longitudinal, cross-sectional view of an electronic cooker and a food body container used for the selective heating of an ice cream and sauce food body;

Fig. 6 illustrates a transverse, cross-sectional view of the food body and food body container illustrated in Fig. 5; and Fig. 7 illustrates a further embodiment of this invention, showing a longitudinal, cross-sectional view of a pre-packaged ice cream and sauce food body and associated apparatus for preparing said food body for heating.

Figure 1:
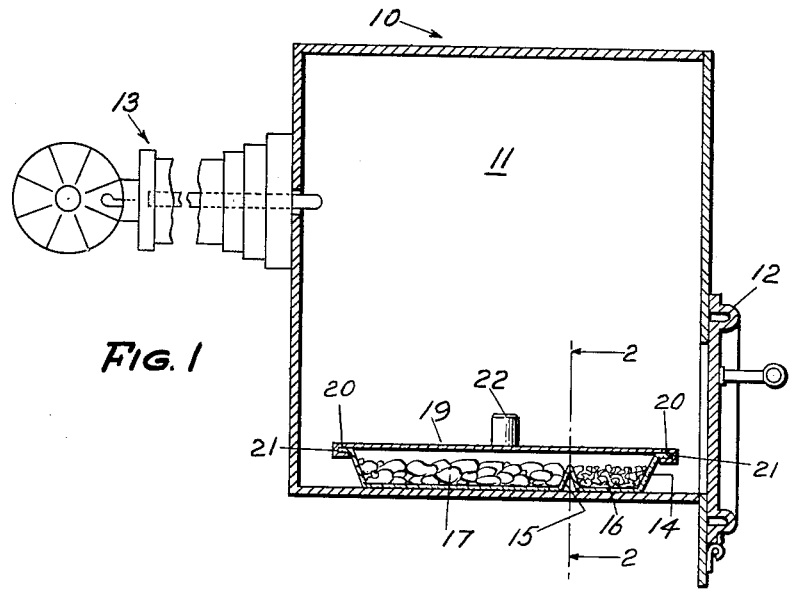
Fig. 1 illustrates a longitudinal, cross-sectional view of an electronic cooker having therein a frozen food body and food body container taken along line 1—1 of Fig. 2.
Figure 2:
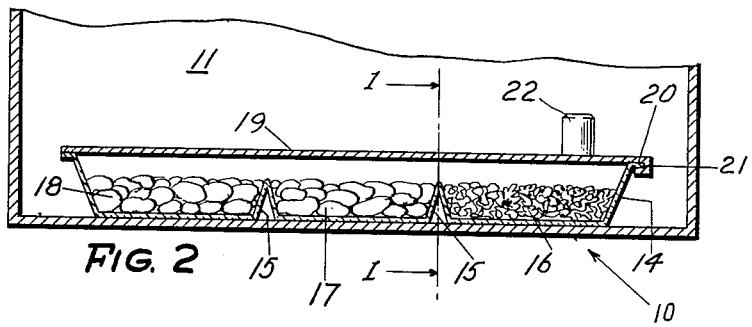
Fig. 2 illustrates a second cross-sectional view of the food body and container shown in Fig. 1 taken along line 2—2 of Fig. 1.

Referring now to Figs. 1 and 2, there is shown an electronic cooker 10 comprising a metallic cavity 11 adapted to be energized by microwaves. Access to said cavity is provided for by a door 12, and said cavity has associated therewith a microwave oscillation generator 13 of any desired type such as, for example, a magnetron which when energized will fill the cavity 11 with microwave energy.

Positioned in cavity 11, there is shown a dielectric container 14 which may be, for example, a paper or plastic tray which is divided into a plurality of compartments, for example, by indentations 15 in the bottom surface thereof. Positioned in the various sections of the tray are various types of food bodies, for example, a complete dinner comprising a body of meat 16 and two vegetables 17 and 18. Covering the top of said tray is a metallic shield member 19 which is, for example, rectangular in form and has the edges of both longer sides and one shorter side bent back upon the main surface of the cover to form grooves, as at 20. These grooves are adapted to engage a lip 21 which extends around the upper edge of container 14 and is unitary therewith. Thus, the cover 19 may be slid on and off from the container 14. A knob 22 is provided on cover 19, whereby removal of the cover 19 from container 14 is facilitated.

Thus, it may be seen that, when the food-filled container 14 and shield 19 are placed in cavity 11, and said cavity is excited with microwave energy, the upper surface of the food body is shielded from direct exposure to said energy. This prevents local burning and dehydration of the food body for the reasons discussed previously.

In the heating of some types and shapes of food bodies, it may be desirable to provide more direct access of the microwave energy to the bottom surface of the food body. This may be accomplished, for example, by placing the container 14 on dielectric blocks.

Obviously, the food bodies could be placed in the container 14 and stored for long periods of time by a food vendor such as a restaurant owner, and when a dinner was ordered, the operator need only place the cover 19 over the container 14, insert the combination in the electronic cooker 10 for sufficient time to cook the food, for example, a few seconds, and then remove the cover 19 to expose the food for eating directly from container 14.

Figure 3:
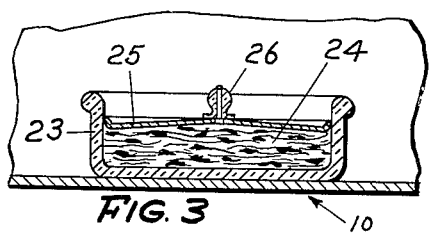
Fig. 3 illustrates a cross-sectional view of a modification of the embodiment of Figs. 1 and 2, showing the shielding of a boiling mass of food during the heating thereof.

Referring now to Fig. 3, there is shown a modification of the embodiment of the invention of Figs. 1 and 2.

A dielectric container 23 is used, said container being of any desired type such as is shown here, by way of example, a Pyrex casserole dish, or it may be a plastic or waterproof paper container. Container 23 has therein a food mass 24 to be heated, said food mass being, for example, strawberries or other berries or fruits in a liquid which is being heated with said berries to make jams or jellies.

It has been found that, when such a food mass is heated by microwaves, the solid portions thereof such as the berries float in the liquid and become partly exposed at the surface thereof. The exposed portions of the berries absorb microwave energy much faster than the liquid, and hence become hardened or partially burnt.

This invention discloses placing a shield member 25 directly on top of the food mass and in contact therewith. As shown here, shield 25 comprises a metal cover having a knob 26 attached to the center thereof, said knob serving as a handle to facilitate the removal of the shield 25 from the container 23. Shield 25 fits loosely with the walls of container 23, and is supported on top of the food mass by the floating berries or solid food portions.

The weight of the shield forces the berries under the surface of the liquid and prevents the upper surfaces of the berries from direct exposure to the microwave energy. As a result, the floating berries are not burnt, but are heated substantially uniformly with the rest of the food mass.

Figure 4:
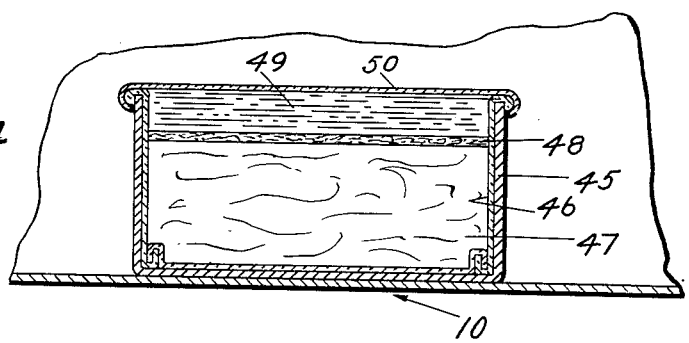
Fig. 4 illustrates a further embodiment of this invention, showing a longitudinal, cross-sectional view of an ice cream and sauce body and a shielding container for preparing said body for eating.

Referring now to Fig. 4, there is shown another embodiment of the invention wherein a metallic shield 45 is utilized, said shield being, for example, a metallic cup. Positioned in shield 45 is a paper cup 46, the lower portion of which is filled with an ice cream body 47. Positioned on top of said ice cream body 47 may be an ice cream cake or cone body 48, and positioned on said body 48 is a layer of sauce 49 which may be, for example, a chocolate or fudge sauce. Covering sauce 49 across the top of paper container 46 is a paper cover 50, the cover 50, cup 46 and its contents being prepackaged by a manufacturer.

To prepare the package for eating, the vendor places the package in shield 45 and places the entire assembly in an electronic cooker 10. Due to the action of shield 45, energy from the cooker 10 can penetrate the food body only from the top thereof through paper member 50. Since the sauce 49 is a relatively high-loss substance, it will absorb substantially all the microwave energy passing therethrough with the result that little or no microwave energy passes into the ice cream body 47. The ice cream body 47 thus remains frozen and, due to the ice crystals therein, substantially entirely reflects any energy which does pass through sauce 49 back into sauce 49. Since the cake member 48 is a relatively good heat insulator, the ice cream body 47 is not melted to any substantial extent by conductive heat from the sauce 49. Upon removal from the electronic cooker 10, the product is ready for eating upon removal of paper cover 50. The resulting product is an ice cream having a hot fudge sauce which may be eaten directly from the paper container 46 inside the shield member 45.

For adequate penetration of the microwave energy into the shield 45, it has been found that the diameter of the lip of the cup-shaped shield should be greater than a half wave length of the microwave frequency used. For example, with the wave length of approximately 12 cm. used in present electronic cookers, it has been found that the diameter of the cup lip should be about 7 cm. or larger. Cup lip diameters on the order of a wave length are desirable for good results.

However, if there is a second aperture in the bottom of the cup, the diameter of the hole at the cup lip may be reduced considerably below a half wave length and still produce good results. Such a shield will now be described.

Referring now to Figs. 5 and 6, there is shown a cavity 11 having therein a food container structure 51 comprising a cup-shaped metallic member 52 having a hole 53 in the bottom thereof. Member 52 rests on a low-loss dielectric base member 54 which may be, for example, polystyrene, member 52 being securely attached to base member 54, for example, by screws 55. Base member 54 is of sufficient height that microwave energy may readily pass therethrough and into the hole 53 in the bottom of member 52.

Inside metallic container 52 is a dielectric food container 56 which may be, for example, a paper cup of any desired construction and of a shape which conforms to the inside of metallic container 52. Inside cup 56 is placed a frozen or other food body such as, for example, ice cream 57. In the center of ice cream member 20 there is positioned a second cup 58 which may be made of any desired edible material such as, for example, a standard ice cream cake or cone material. Cup 58 is coaxial with cup 56 with the bottom of cup 59 resting on the bottom of cup 56. The diameter of the bottom of cup 58 is made substantially equal to the diameter of the hole 53 in shielding member 52 and is coaxial therewith. Cup 58 contains a sauce material 59 such as, for example, a fudge or chocolate sauce.

Positioned over the top of cups 56 and 58 is a paper cover member 60. Positioned on top of paper cover member 23 is a metallic cover 61. Cover 61 has therein a hole 62 coaxial with the cup 58 and substantially the same diameter as the cup 58. Attached to cover 61 there is shown, by way of example, a low-loss dielectric handle 63 whereby cover 61 may be removed from the remaining structure. The paper cup 56, together with the ice cream body 57, the cup 58, the sauce body 59 and the paper cover 60, makes a unit which may be produced and packaged, for example, by a manufacturer and then delivered to the vendor who preserves the package in a refrigerator. When this unit is to be used, it is placed in shield container 52 and covered by cover 61 and the entire device placed in the electronic cooker.

Upon energization of the cooker, it has been found that microwave energy will pass through holes 53 and 62 and through the sauce body 59 rapidly heating the same to the desired temperature. Due to the shielding action of shield 52 and cover 61, little or no energy is absorbed by the ice cream body, while the sauce is sufficiently exposed to microwave energy to produce rapid heating thereof. Obviously, the shield member 52 and cover 61 may be reused with new packaged units of the cup 56 and its contents.

Referring now to Fig. 7, there is shown another embodiment of this invention wherein a cone-shaped paper cup 64 is used as the food body container. In this case, the container cup 64 is filled in upright position, for example, by a manufacturer with a sauce body 65 such as, for example, strawberry sauce in the apex of the cone and an ice cream body 66 then placed on the top of the sauce body 65. The open end of the cone container 64 may be covered, for example, by a paper cover 67 after which the food body may be sent to the vendor who stores it in a refrigerator. Upon use, the cone container 64 is placed with the paper cover 67 down in a shallow container 68 such as a metal dish, shown here by way of example, as supported on a base 69 attached to dish 68 by screws 70.

Positioned over the apex of the cone 27 is a metallic shielding cone 71 which covers the portion of the paper cone 64 containing the sauce 65. The whole assembly is then placed in electronic cooker 10 which when energized by microwaves heats the interface between the cone 64 and the ice cream body 66, as well as the interface between the sauce body 65 and the cone 64. The shielding member 71 is then removed and the cone 64 may be removed from the food body since the interface between the cone and the food body which was previously frozen together is now melted. The food body is thus exposed for eating.

Since the sauce body 65 has considerably higher losses and higher surface area per unit volume than the ice cream body 66, the shielding member 71 is necessary to prevent this portion of the food body from becoming overheated. However, if it is desired that the sauce body be heated throughout, for example, if the sauce were a fudge sauce, the shield member 71 may be omitted during the heating process. Since the portion of the container occupied by the sauce body 65 is the apex thereof, a large surface area of the sauce body would be presented to the microwave energy as compared to the volume thereof, thus resulting in a rapid heating of the sauce. Obviously, other shapes than conical shapes could be used such as, for example, pyramids, the only requisite being that there be sufficient taper to the paper container to allow it to be drawn off from the food body following the heating thereof.

This completes the description of the embodiments of the invention illustrated herein. However, many modifications thereof will be apparent to persons skilled in the art without departing from the spirit and scope of this invention. Therefore, applicant does not wish to be limited to the particular details of the modifications of the invention illustrated herein, except as defined by the appended claims.

What is claimed is:

1. In combination, a low-loss microwave cavity, and means for supplying said cavity with radiated microwave energy, said cavity having positioned therein a low-loss dielectric container having therein a lossy material to be heated, means for coupling microwave energy into said cavity, and a conductive shield positioned closely adjacent said material to be heated and interposed between said coupling means and said material whereby selective heating of said material by said microwave energy is produced.

2. In combination, a low-loss microwave cavity, and means for supplying said cavity with radiated microwave energy, said cavity having positioned therein a low-loss dielectric container having therein a refrigerated food body to be heated, means for coupling microwave energy into said cavity, and a conductive shield positioned closely adjacent said body and interposed between said coupling means and said body whereby selective heating of said body by said microwave energy is produced.

3. In combination, a low-loss microwave cavity, and means for supplying said cavity with radiated microwave energy, said cavity having positioned therein a low-loss dielectric container having therein lossy material to be heated, and a conductive shield interposed between said supplying means and said material and covering said material whereby selective heating of said material by said microwave energy is produced.

4. In combination, a low-loss microwave cavity, and means for supplying said cavity with radiated microwave energy, said cavity having positioned therein a low-loss dielectric container having therein a lossy material to be heated, means for coupling microwave energy into said cavity, and a conductive shield positioned closely adjacent said material to be heated and interposed between said coupling means and said material whereby selective heating of said material by said microwave energy is produced, said conductive shield resting on said material to be heated.

5. In combination, a low-loss microwave cavity, and means for supplying said cavity with radiated microwave energy, said cavity having positioned therein a low-loss dielectric container having therein a refrigerated food body to be heated, means for coupling microwave energy into said cavity and a conductive shield positioned closely adjacent said body and interposed between said coupling means and said body whereby selective heating of said body by said microwave energy is produced, said refrigerated food body comprising a frozen food body and a non-frozen food body positioned over said frozen food body, the portion of said dielectric container adjacent said non-frozen food body being surrounded by said conductive shield.

6. In combination a low-loss microwave cavity, and means for supplying said cavity with radiated microwave energy, said cavity having positioned therein a conical low-loss dielectric container having therein a refrigerated food body to be heated, means for coupling microwave energy into said cavity and a conductive shield positioned closely adjacent said body and interposed between said coupling means and said body whereby selective heating of said body by said microwave energy is produced, said refrigerated food body comprising a frozen food body and a nonfrozen food body positioned over said frozen food body on the apex of said container, a portion of said dielectric container adjacent said nonfrozen food body being surrounded by a conductive shield.

7. In combination, a low-loss microwave cavity, and means for supplying said cavity with radiated microwave energy, said cavity having positioned therein a low-loss dielectric container having therein a lossy material to be heated, means for coupling microwave energy into said cavity, and a conductive shield positioned closely adjacent said material to be heated and interposed between said coupling means and said material whereby selective heating of said material by said microwave energy is produced, said conductive shield having an aperture therein having a dimension greater than a half wave length of said microwave energy.

8. In combination, a low-loss microwave cavity, and means for supplying said cavity with radiated microwave energy, said cavity having positioned therein a low-loss dielectric container having therein a lossy material to be heated, means for coupling microwave energy into said cavity, a conductive shield positioned closely adjacent said material to be heated and interposed between said coupling means and said material whereby selective heating of said material by said microwave energy is produced, said conductive shield comprising a conductive container surrounding said dielectric container and having an aperture therein, and a base member cooperating with said container to maintain said aperture above the bottom of said base member, said base member being transparent to microwave energy.

9. The method which consists in dielectrically heating a food package by means of high frequency alternating current and controlling the heating effect by an electrically conductive shield positioned in proximity to a portion of the food package and acting to prevent access of the high frequency waves to portions of the package and to cause the high frequency waves to reach and heat some portions of the package to a greater degree than other portions thereof.

10. The method which consists in dielectrically heating a package of ice cream by means of high frequency alternating current and effecting uniform softening of the ice cream throughout its entire mass by means of an electrically conducting shield positioned in proximity to portions of the package and in the path of the high frequency waves.

11. The method which consists in dielectrically heating a package containing a multiplicity of food products in juxtarelation to one another by means of high frequency alternating current while placing in proximity to one of said food products an electrically conducting shield and thereby preventing access of the high frequency waves to portions of the package and heating the different food products to different degrees while located in the same electronic field.

12. The method which consists in dielectrically heating a food package containing different food products with a barrier therebetween by means of high frequency alternating current while positioning in proximity to one of said food products an electrically conducting shield and thereby preventing access of the high frequency waves to portions of the package and heating the different food products to different degrees.

References Cited in the file of this patent

UNITED STATES PATENTS

| Number | Name | Date |
|---|---|---|
| 2,402,663 | Ohl | June 25, 1946 |
| 2,413,003 | Sherman | Dec. 24, 1946 |
| 2,421,334 | Kline | May 27, 1947 |
| 2,422,189 | Fiske | June 17, 1947 |
| 2,436,732 | Rowe | Feb. 24, 1948 |
| 2,467,230 | Revercomb et al. | Apr. 12, 1949 |
| 2,480,679 | Spencer | Aug. 30, 1949 |
| 2,480,682 | Stiefel | Aug. 30, 1949 |
| 2,495,415 | Marshal | Jan. 24, 1950 |
| 2,495,435 | Welch | Jan. 24, 1950 |
| 2,497,670 | Hanson et al. | Feb. 14, 1950 |
| 2,500,752 | Hanson et al. | Mar. 14, 1950 |
| 2,504,109 | Dakin et al. | Apr. 18, 1950 |
| 2,597,825 | Schroeder | May 20, 1952 |
| 2,599,033 | Wild | June 3, 1952 |
| 2,612,596 | Gross | Sept. 30, 1952 |

FOREIGN PATENTS

| Number | Country | Date |
|---|---|---|
| 616,996 | Great Britain | Jan. 31, 1949 |